July 2, 1929.    H. L. MYERS    1,719,072

BRUSH RETAINING DEVICE

Filed May 26, 1927

Inventor

H. L. Myers

By Clarence A. O'Brien
Attorney

Patented July 2, 1929.

1,719,072

UNITED STATES PATENT OFFICE.

HARRY L. MYERS, OF TOLEDO, OHIO, ASSIGNOR TO THE AMERICAN FLOOR SURFACING MACHINE COMPANY, OF TOLEDO, OHIO.

BRUSH-RETAINING DEVICE.

Application filed May 26, 1927. Serial No. 194,398.

The present invention relates broadly to an improved floor surfacing machine of the single disc heavy duty type used for cleaning, waxing, brushing, polishing, and keeping floors of various kinds in a desirable condition and has more particular reference to a brush retaining device therefor.

Briefly, a machine of this type comprises a somewhat cylindrical gear casing having a spun-steel guard or rim at its bottom. This rim provides a shield for a gear driven plate known as an adapter plate, and the latter constitutes a mounting for a quick detachable surface treating attachment, here shown as a rotary brush.

The rim conceals and protects the plate and attachment. Connected rigidly to one peripheral side of the casing is a wheeled truck upon which the major portion of a vertical electric motor is supported. An operating handle is rigidly fastened to said truck and extends rearwardly and upwardly in the direction of the operator to the desired elevation.

An important aim and object is to provide, as a new product of manufacture, a special adapter plate equipped with novel retaining means and an attachment having headed studs cooperable therewith, these features being characterized by an arrangement of details constructed to produce an unusually practical and efficient rapid change coupling.

In the accompanying drawings forming a part of this application and in which like numerals are employed to designate like parts throughout the same:—

Figure 1:
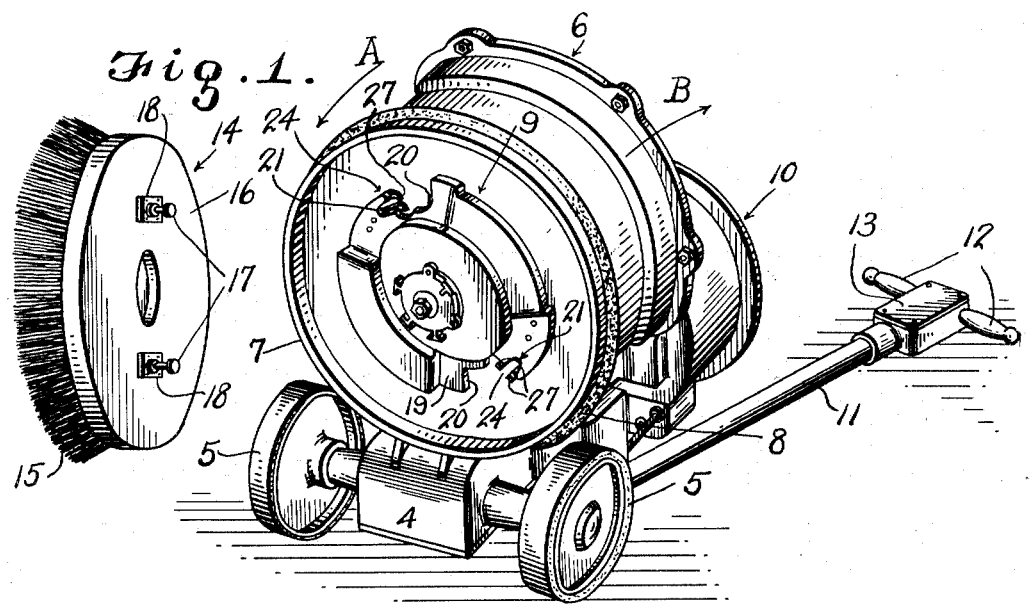
Figure 1 is a perspective view of a machine constructed in accordance with the invention showing the body tilted, the adapter plate exposed, and the attachment in readiness for placement.

Before beginning the detailed description, attention is invited to the fact that only those parts of the machine which represent the alleged novelty have been shown in the drawings, all unessential details having been purposely omitted to prevent the gist of the invention from being obscured.

Proceeding in accordance with the foregoing, it will be observed that the reference character 4 designates generally what is designated as a truck, the same being of appropriate configuration and including suitable journals and supporting wheels 5. Integrally connected with the truck casting is a somewhat cylindrical gear casing generally designated by the reference character 6.

As far as the alleged novelty of the invention is concerned, this casing may be of any appropriate configuration. It will be noted however, that the casing includes, as better shown in Fig. 2, an annular rim 7 at its bottom and a rubber bumper 8. Confined within the area of the rim 7 and spaced above the bottom edge of the same is a rotatably mounted part which is generally designated by the reference character 9 and which is specifically known in the art as an adapter plate.

This is fastened to the driven shaft in any appropriate manner (not shown). Before describing in detail the adapter plate, it is desirable to state now that the reference character 10 designates an upright motor. In practice this motor is sometimes referred to as a vertical interchangeable motor. It is located to the right of the axis of rotation of the adapter plate and has its greatest weight supported above the truck. In this connection, I wish to point out that the truck wheels have the additional function of providing a fulcrum whereby the body of the machine, as an entirety, can be swung, from a horizontal operating position to a tilted vertical position.

Here, it will be noticed that a handle 11 is rigidly fastened to the truck at a point above the horizontal fulcrum just described. The connection between the handle and the truck is rigid and normally the handle is used for pushing the truck and machine along the surface. However, it can be used as a lever for tilting the machine from the horizontal working position, to the vertical interchanging position, whereupon the handle is employed as a prop and is intended to rest upon the floor.

Its position with respect to the other parts are such as to insure proper balancing and self maintenance of the machine in this tilted state. Incidentally, I might state that the handle is provided with customary hand grips 12 and switch box 13.

Strictly in line with the tiltable feature of the machine, is the rapid change clamping device which provides separable joints between the adapter plate 9 and a surface treating attachment 14, here shown in the form of a brush. In other words, the main purpose of having the body tiltable, is to dispose the adapter plate in a readily accessible non-tiltable position to permit the operator to use both hands in applying and detaching the surface treating attachment.

The continuity of function and advantage here is quite evident. A particular type of clamp and coupling means is employed to enhance the efficiency of the arrangement just described, and this means is detailed especially in Figs. 2 and 3. At this time, it is though advisable to call attention to the fact that the machine here shown represents a powerful electric machine for producing and maintaining a pleasing and durable finish on floors of all kinds, including wood, terrazzo, marble, linoleum, tiles, cement, composition, or metal.

Also, as before indicated, it cleans, waxes, polishes, scrubs and sands. For this reason, the machine when marketed embodies a number of attachments of the general construction represented in Fig. 1. For example, I use a waxing brush, a polishing brush, a burnishing pad, a scrubbing brush, a wire brush for scouring, and a sanding pad, all of these being constructed along the same general lines as the brush represented in Fig. 1, and being adapted for separable connection with the adapter plate.

Irrespective of the type of attachment employed, the same embodies surface treating means 15 and a backing member or head 16, the latter being provided with small headed studs 17 rigidly fastened at diametrically opposite points to the backing member, through the medium of small attaching flanges 18.

Individual, substantially diametrically opposite devices are provided on the adapter plate for cooperation with each headed stud on the brush. A description of one device will suffice for both, it is believed. Attention is therefore particularly invited to Fig. 3, wherein it will be noted that the peripheral portion of the adapter plate 9 is provided with an arcuate or segmental raised portion 19.

This portion is formed with a notch 20 at one end and a reduced keeper seat 21 at the opposite end, this seat being adapted for snug reception of the shank of the headed stud 17. Incidentally, it will be noticed that the marginal edges of the notch are shaped to facilitate placement of the studs in the keeper seats. In addition, on one side of the notch, is a clearance space 22 whose function will be made clear later.

Carried by one end portion of the raised part 19 is an elevated mount 23 for a resilient clip generally designated by the reference character 24. This clip comprises a flat sturdy spring arm 25 rigidly secured to the mount 23 and extending over and beyond the keeper seat 21 and into the area of the notch 20. The overhanging portion thereof is bifurcated to form a resilient retaining fork, the fingers of which are designated by the reference characters 26.

The extremities of these fingers are bent down as at 27 to permit the head of the stud to ride upwardly thereon, and in between the fingers, for reception in the keeper seat. Here, I might state that the clearance opening 22 serves to allow the proper freedom of movement of one of the beveled extremities 27. I desire to especially call attention to the fact that the crotch portion of the fork is spaced to the left of the corresponding portion of the keeper seat 21. Thus, the shank of the stud bears directly against the crotch portion of the keeper seat which is of heavy metal, rather than against the comparatively light weight spring clip 24. This transfers and distributes the stresses appropriately, bringing the load against the heavy metals of the adapter plate rather than against the clip and allowing the clip to function primarily as a supplemental guard and retainer to prevent retrograde rotation of the brush or accidental displacement thereof.

Figure 2:
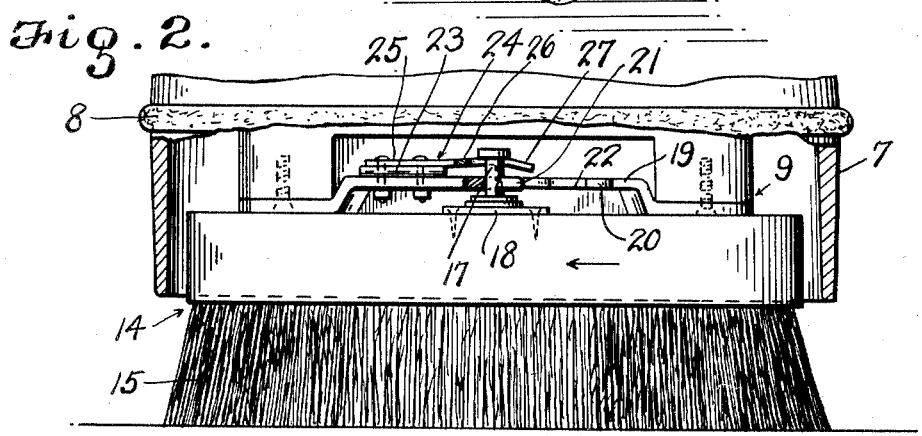
Fig. 2 is a view on an enlarged scale showing the rim of the gear casing and detailing the specific coupling.
Figure 3:
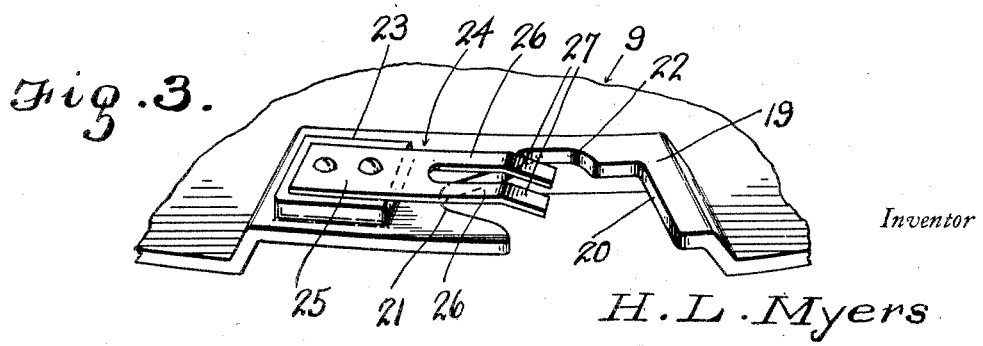
Fig. 3 is an enlarged fragmentary perspective view of a portion of the adapter plate showing the principal part of the improved coupling.

In practice, it is understood that when the machine is in running position, the adapter plate 9 is parallel to the surface and the body composed of parts 6 and 10, is in the vertical position. This brings the bristles of the brush into contact with the floor as shown in Fig. 2. Thus, a three-point contact is had, the brush resting against the surface and the truck wheels resting against the surface. The truck wheels thus serve for propelling the machine while the brush cleans the surface.

If it is desired to wax, burnish, polish, or otherwise treat the surface of the floor after having cleaned the same with the brush, the brush is removed by turning the headed studs out of the notches in a direction from left to right in Fig. 2. Then, the other attachment (not shown) is placed in position by inserting the studs simultaneously into the notches 20 and then turning the attachment in the direction of the arrow in Fig. 2.

Of course when interchanging the attachment, the handle 11 is moved toward the operator and forced down against the floor, whereupon the body is rocked about the fulcrum of the truck wheels to assume the tilted position and to clearly expose the attaching devices on the adapter plate. Thus, the machine is in a steady position to facilitate attachment and detachment, giving the operator free use of both hands.

In tilting the machine, it is of course moved into the direction of the arrow B while turning it down to operative position again it is moved in the direction of the arrow A.

Having thus described my invention, what I claim as new is:—

1. In a structure of the class described, a plate having a notch in its periphery, said notch being provided with a stud entrance at one end, and a keeper seat at the opposite end, a complemental part, a headed stud carried by said part and insertible through the entrance of said slot and turnable by rotary motion of said part into said keeper seat, and a spring clip carried by said plate, spaced from said plate and including retaining fingers cooperable with said notch, said retaining fingers being adapted to embrace the shank of said stud and to engage the head on said stud for maintaining said plate and part together for simultaneous rotation.

2. In a structure of the class described, a rotary plate provided with a peripheral slot having an entrance opening and a keeper seat, a part for cooperation with said plate provided with a body for contact with the plate, a headed stud including a shank insertible through the entrance of said slot and turnable by rotary motion of said part into said seat, a raised mount carried by said plate, a resilient clip rigidly fastened to said mount including a forked end portion, the fingers of the fork of which overlie said seat and slot to embrace said shank and to engage said head.

3. In a structure of the class described, a rotary plate provided with a peripheral slot having an entrance opening and a keeper seat, a part for cooperation with said plate provided with a body for contact with the plate, a headed stud including a shank insertible through the entrance of said slot and turnable by rotary motion of said part into said seat, a raised mount carried by said plate, a resilient clip rigidly fastened to said mount including a forked end portion, the fingers of the fork of which overlie said seat and slot to embrace said shank and to engage said head, said fingers terminating in beveled extremities, and the crotch of said fork being spaced away from the corresponding portion of said seat to prevent the shank from engaging the crotch in said fork.

In testimony whereof I affix my signature.

HARRY L. MYERS.